Patented May 1, 1945

2,374,877

UNITED STATES PATENT OFFICE 2,374,877

PROCESS OF PRODUCING A MIXED CRYSTAL CROP COMPRISING MAINLY SODIUM BICARBONATE AND POTASSIUM PENTABORATE OCTOHYDRATE

Frank Henderson May, Trona, Calif., assignor to American Potash & Chemical Corporation, Trona, Calif., a corporation of Delaware No Drawing. Application October 22, 1943,
Serial No. 507,300

6 Claims. (Cl. 252—192)

This invention relates to a process of producing a mixed crystal crop, consisting mainly of potassium pentaborate ($K_2B_{10}O_{16}.8H_2O$) and sodium bicarbonate ($NaHCO_3$).

The process of the present invention produces a mixed crystal which, upon analysis, may conform exactly to the formulae $K_2B_{10}O_{16}.8H_2O$ and $NaHCO_3$, but under some conditions of operation, the salts precipitated do not conform exactly with said formulae. I refer, therefore, to the product of the present process as a mixed crystal crop and as one consisting essentially of potassium pentaborate octohydrate and sodium bircarbonate, without, however, asserting that the mixed crystal crop rigidly adheres to the formulae for such components.

A mixed crystal crop of the type produced by the process of the present invention is a valuable material for many purposes. One valuable use of the mixed crystal crop produced by the process of this invention is in producing absorption liquors used in the process of my copending application, Serial No. 462,425, filed October 17, 1942.

In the process of the present invention the mixed crystal crop is produced by a reaction between potassium chloride (KCl), borax

and carbon dioxide ($CO_2$). These reagents react together in the presence of an aqueous solution in accordance with the following equation:

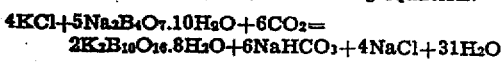

From the foregoing equation, it will be seen that potassium pentaborate octohydrate, sodium bicarbonate, and sodium chloride are all products of the above reaction. Such reaction may be carried out to effect crystallization from the solution of some pure potassium pentaborate octohydrate, the sodium bicarbonate and sodium chloride formed remaining in solution. The present invention relates, however, to a process for carrying out such reaction in order to crystallize both the potassium pentaborate and sodium bicarbonate formed, leaving sodium chloride in solution. Where the above reaction is carried out to crystallize only potassium pentaborate octohydrate solution, the end liquors of the process are high in potassium and borate values, and such end liquors must be ordinarily processed to recover these values. Where the process of the present invention, however, is employed, the recovery of the potash and boron values is high and the end liquor produced is low in the valuable boron potassium elements, and consists mainly of a solution of sodium chloride, which solution may be discarded.

The reaction between potassium chloride, borax, and carbon dioxide can not, however, practically be carried out in the presence of water alone in such manner as to precipitate the larger part of the potassium and borate values. Any attempt to carry out the process in this manner results in the formation of so dense a sludge that it can not be economically separated from the end liquor and a pure product produced. The process of the present invention is dependent upon adding potassium chloride, borax, and carbon dioxide to a liquor which to a large extent may consist mainly of a solution of sodium chloride. The employment of such a solution of sodium chloride as a medium for conducting the desired reaction permits the production of the desired crystal crop without the formation of sludges of such density as to inhibit practical separation of the crystals from the end liquor of the process. The medium employed for conducting the reaction of the present invention may be a pure sodium chloride soltion, or may be part of the end liquor produced in the process of the present invention, since said end liquor is a liquor high in sodium chloride and low in other constituents. The process of the present invention, however, differs from ordinary cyclic processes where an end liquor high in valuable constituents to be recovered is returned.

The process of the present invention will be more completely understood from the following preferred examples of the process.

In the preferred example of my process I employ the end liquor from a previous operation. Such an end liquor is high in sodium chloride and low in potassium and boron compounds. Once the cycle has been established, there will always be available sufficient end liquor to maintain the cycle. However, to start the cycle, it may be desirable to prepare a substitute for the end liquor. A suitable substitute for the end liquor might be made merely by dissolving sodium chloride in water. A somewhat better approximation of the end liquor may be produced by adding a small amount of potassium chloride. For example, the process may be started by employing as a substitute end liquor a solution formed by adding 29 to 30 parts of sodium chloride, and 3.3 parts of potassium chloride to 100 parts of water. The use of this synthetic liquor in place of an end liquor from a previous operation will reduce slightly the yield in the first operation of the process, but in subsequent cycles full yields will be obtained.

To the end liquor or to the liquor which is predominantly sodium chloride, I add potassium chloride, borax and water, and then carbonate the mixture. The potassium chloride may be added all at the start of the operation. Likewise, the borax may be added all at the start of the operation if the carbonating mechanism employed is capable of handling very heavy sludges or suspensions. In other cases, it may be desirable to add the borax in steps during the carbonation procedure. These ingredients should be added in definite proportions. In order to form the desired crystal crop, there should be added 3.08 parts of $Na_2B_4O_7$ (on the anhydrous basis) for each part of KCl. There should also be added 3.5 parts of $H_2O$ for each part of KCl, said added $H_2O$ to include the water of crystallization of the borax—which water is liberated during the course of the reaction. This added water is, of course, over and above the water contained in the end liquor employed. In the carbonating operation 0.82 part of carbon dioxide should be absorbed for each part of potassium chloride added. These relative quantities should be maintained essentially constant in the process independent of the amount of end liquor employed as compared with the other chemicals utilized.

The ratio of end liquor to other chemicals utilized may, however, undergo somewhat wide variations. This may be illustrated by comparing the amount of end liquor to be utilized with the potassium chloride added. The process may be operated satisfactorily using as low as 8 and as high as 20 or more pounds of end liquor for each pound of potassium chloride added in the process. As a specific example of my process, I add 300 pounds of potassium chloride to 2400 pounds of end liquor from a previous batch, the end liquor being obtained at 40° C. This end liquor is sufficient to dissolve all of the potassium chloride, but in the operation a small residue of other salts, including sodium chloride, may appear. Such a residue might be filtered out before proceeding with the subsequent steps, but for practical purposes may be allowed to remain.

To the solution of potassium chloride and end liquor I add 225 pounds of water and 1750 pounds of borax ($Na_2B_4O_7.10H_2O$). The borax contains about 925 pounds of sodium tetraborate ($Na_2B_4O_7$) and about 825 pounds of water of crystallization. Hence, the total water added to the end liquor is about 1050 pounds. In the carbonating operation about 240 to 250 pounds of carbon dioxide is absorbed.

The progress of the carbonating reaction may be followed analytically and should be continued until the liquid phase of the product contains about 29 parts of sodium chloride per 100 parts of excess water. It is to be understood that the end liquor from the carbonating operation is a complex liquor containing sodium and potassium, chloride, bicarbonate, tetraborate, and pentaborate compounds. It is not feasible to analyze such a solution to determine the actual amount of sodium chloride present. In describing the end liquor as one containing 29 parts of sodium chloride per 100 parts of excess water, I have reference to the following system of reporting the analysis of such solution:

In the system employed all of the $CO_2$ content of the end liquor is reported as sodium bicarbonate. All of the borate content of the solution is reported as made up of borax ($Na_2B_4O_7.10H_2O$) and potassium pentaborate ($K_2B_{10}O_{16}.8H_2O$). With these assumptions made, it is then possible to state the relative quantities of chlorides which must be present as potassium chloride and sodium chloride in the end liquor. The term "excess water" has reference to the amount of water present, which is not included in the borax, the sodium bicarbonate, and the potassium pentaborate octohydrate present. Obviously, the analysis of such an end liquor might be reported by various other somewhat arbitrary systems, in which the reported quantity of sodium chloride would be different from that indicated. Such would be the case, for example, if the bicarbonate content of the brine was reported as potassium bicarbonate, instead of sodium bicarbonate, or if the tetraborate content was reported as potassium tetraborate, or partially as potassium tetraborate, in place of sodium tetraborate.

Obviously, another method of controlling the carbonation operation is to analyze the sample of the total sludge for its combined carbon dioxide content, in which case the completion of the reaction will be indicated upon the absorption of the approximately 240 or 250 pounds of carbon dioxide to be used.

In the carbonating step I prefer to employ a sufficiently rugged carbonator equipped with an agitator to permit agitating a relatively heavy sludge. The partial pressure of carbon dioxide over the sludge in the start of the reaction is about 150 mm. Hg. As the reaction proceeds, the partial pressure increases and reaches about 600 mm. Hg. at 40° C. at the completion of the reaction. The carbonation should be carried out in a closed pressure vessel, using pressures of carbon dioxide in excess of these minimum requirements. In this example of my process, I prefer to employ essentially pure carbon dioxide gas.

Upon the completion of the carbonating reaction, the mixed crystal crop is separated from the liquor by means, for example, of a centrifugal machine. A portion of the liquor is removed from the cycle and the remainder saved for the next operation. The centrifuge solids may be washed, if desired. In washing operations, I prefer to use the cold saturated solution of borax, instead of water. The washing fluid is preferably kept apart from the bulk of the end liquor, and the water content of this wash fluid may replace the 225 pounds of water in whole or in part, which were stated as added at the start of the cycle. The quantity of borax so entering the process with the wash liquid should be subtracted from the amount of further borax to be added.

To complete the cycle, I remove from the cycle about 1050 pounds of end liquor which contains about 215 pounds of sodium chloride. The remaining end liquor (2400 pounds) is returned to the next cycle. By the operation of this process, a mixed crystal crop, consisting essentially of about 1500 pounds of sodium bicarbonate and potassium pentaborate octohydrate, is produced. Following the washing operation on a liquor-free basis, the product represents about 30% sodium bicarbonate. The remainder is pentaborate, potassium, and combined water. Usually, I find somewhat more pentaborate present than corresponds with the total potassium present, as required by the compound $K_2B_{10}O_{16}$. However, no solid phase of sodium chloride appears in the product.

In this example of my process, the ratio of suspended solids to total sludge in the finished batches is about 30%. This is quite thick or heavy sludge, and at times it may be desirable to operate with a sludge of lesser density. This may be accomplished by adding a greater amount of cyclic end liquor at the start of the operation. As before stated, in place of the ratio of end liquor to potassium chloride of 8 to 1, ratios of 20 to 1 or more may be employed. The ratio of the other ingredients added with the potassium chloride, however, should not be essentially changed.

While the end liquor employed in the above example contained about 29 parts of sodium chloride per 100 parts by weight of excess water, it is permissible to increase the sodium chloride concentrations up to about 35 parts of sodium chloride per 100 parts of water.

Where, as in the above example, a part of the end liquor is discarded (1050 pounds), this represents a loss of about 13% of the potassium values and about 6% of the boron values added. These losses are not excessive, but may be reduced by the following procedure: I have found that this end liquor is an unstable liquid, and, if the end liquor be agitated for a period of several days—sometimes up to a week, a secondary crystallization occurs. In this secondary crystallization there is crystallized a mixed crystal crop which contains predominantly the ingredients sodium, potassium, tetraborate, and pentaborate. The mixed crystal crop may be calculated in the main to $Na_2B_4O_7$ and $K_2B_{10}O_{16}$ (with some $NaHCO_3$ and $Na_2B_{10}O_{16}$), but microscopic and physical chemical tests indicate that not all these compounds are the true solid phases present. The practical effect of the crystallization of this secondary crop of mixed crystals, however, is the fact that this crystallization markedly reduces both potassium and borate contents of the end liquor.

In one example of the process of the present invention this secondary precipitation reduced the boron and potash values in the end liquor to only 2% and 4% of the boron and potassium added. This second crop of crystals may be used in various manners. For example, it may be added to the original batch, when the potassium chloride, etc. are added. Under the influence of $CO_2$ and of the relatively high KCl concentrations, this second, mixed-crystal crop seems to become converted to about the same composition as the first crop, above described.

While in the foregoing example borax, i. e., the decahydrate of sodium tetraborate was employed, other hydrates of sodium tetraborate may be obviously employed, such as $Na_2B_4O_7.5H_2O$, $Na_2B_4O_7.4H_2O$; or calcined products such as $Na_2B_4O_7.3.8H_2O$, or even pyroborate ($Na_2B_4O_7$). In substituting these for common borax, the total quantity of water entering the reaction (exclusive of the water in the end liquor cycled) must be kept constant; that is, any water of crystallization of the borax or sodium tetraborate employed, plus the added water, should always bear the relationship of about 3.5 times of the added potassium chloride, while the anhydrous sodium tetraborate content should maintain the relationship of 3.08 to 1 KCl.

As an example of using a partially calcined borax as a raw material, I employ a product previously dehydrated to a water content of about 25%, or to about 3.8 mols $H_2O$ ($Na_2B_4O_7.3.8H_2O$), sufficient of said raw material being taken to supply the aforesaid 925 pounds of $Na_2B_4O_7$. To 725 pounds of water I add 300 pounds of KCl, most of which dissolved immediately. I set aside 2400 pounds of end liquor from a previous batch. In this instance, I elected to add about 500 pounds of it to the aforesaid 725 pounds of water and 300 pounds of KCl. This resulted in the complete dissolution of the KCl. In this experiment, I also elected to add the calcined borax, and the remainder of the cyclic end liquor gradually and continually during the carbonation. However, I took steps to assure that sufficient calcined borax was added, so that inspection of the sludge showed the presence of crystals of $Na_2B_4O_7.10H_2O$ until the completion of the reaction. Over a period of ten hours, I added said components, together with 245 pounds of carbon dioxide. Partial pressure of $CO_2$ at the start of the carbonation was about 100 mm. Hg. Upon completion of the carbonation, the batch was identical with the example described above, and the procedures followed from that point were the same. Yields, etc., were of course the same.

The process is of value in recovering potassium and/or boron values from solutions containing the same, together with sodium chloride. For example, in the process of my copending application, Serial No. 507,299, filed October 22, 1943, for the production of pure $K_2B_{10}O_{16}.8H_2O$, there is produced an end liquor high in potassium and boron. This liquor may be treated by the process of the present invention for the production of a valuable mixed-crystal crop and the salvage of dissolved values.

The shortest way in which to describe how such a liquor is to be treated in the present process is to consider the original preparation as having constituted a partial step in the operation of the present process, and to continue with the present process from that point. This may be illustrated by the following tabulation:

|  | KCl | Borax | $H_2O$ | $CO_2$ | End liquor |
|---|---|---|---|---|---|
| Ingredients for a batch, in present process | 300 | 1,750 | 225 | 245 | 2,400 |
| Ingredients already added to the liquor to be re-treated by this process | 90 | 135 | 225 | 15 |  |
| Difference, additional ingredients to be added to liquor to be re-treated by present process | 210 | 1,615 | 000 | 230 | 2,400 |

So, such a liquor, prepared according to the second line above, may be re-treated, and caused to yield a valuable mixed crystal crop containing potassium pentaborate or the equivalent thereof, while recovering valuable boron and potassium values therefrom. It must be remembered that the liquor to be re-treated had already produced a crop of pure $K_2B_{10}O_{16}.8H_2O$, and consequently that the mixed crystal crop produced by addition of further (210 lb.) KCl, etc., will not be quite the same as the mixed crystal crop produced from the ingredients listed in the first column above. However, since the composition of the mixed crystal crops obtained by the operation of the present process are known to be somewhat variable, and since despite such variations they constitute valuable and useful products, this variation is of little consequence.

In my copending applications Serial Nos. 460,-

278, filed September 30, 1942; 462,425, filed October 17, 1942; 466,675 filed November 23, 1942, and 507,298, filed October 22, 1943, I have described cyclic processes for absorbing and recovering carbon dioxide from gases containing the same, which involve the precipitation of either potassium pentaborate octohydrate alone or admixed with sodium bicarbonate but in which processes the mixed crop is redissolved in the cycle.

While the particular forms of the process herein described are well adapted to carry out the objects of the present invention, it is to be understood that various modifications may be made, and this invention is of the scope set forth in the appended claims.

I claim:

1. A process of manufacturing a mixed crystal crop, which comprises adding to a solution containing mainly sodium chloride the ingredients potassium chloride, borax and water and then carbonating the resulting sludge, the ingredients added and the carbon dioxide absorbed being in proportions suitable for forming potassium pentaborate octohydrate and sodium bicarbonate, crystallizing a mixed crystal crop consisting essentially of such latter compounds during the carbonation operation while completing the solution of the ingredients added, and thereafter separating the mixed crystal crop from the produced mother liquor.

2. A process of manufacturing a mixed crystal crop, which consists essentially of potassium pentaborate octohydrate and sodium bicarbonate, which comprises adding potassium chloride, borax, and water in essentially the proportions required to produce potassium pentaborate octohydrate and sodium bicarbonate to a solution containing mainly sodium chloride, and thereafter carbonating the resulting sludge to complete the solution of the added ingredients while precipitating the mixed crystal crop consisting essentially of said potassium pentaborate octohydrate and sodium bicarbonate, and thereafter separating the crystal crop from the produced solution.

3. A process of manufacturing a crystal crop, consisting essentially of potassium pentaborate octohydrate and sodium bicarbonate, which comprises adding to a solution potassium chloride, borax, and water, carbonating the resulting sludge, approximately 3.1 parts of $Na_2B_4O_7$, 3.5 parts of $H_2O$, and 0.8 part of carbon dioxide being added for each part of KCl added, the solution to which said ingredients are added being employed in the proportions of about 8 to 20 parts for each part of KCl, said solution containing mainly sodium chloride, precipitating said mixed crystal crop during the addition of carbon dioxide, and separating the mixed crystal crop from the resulting solution.

4. A process of manufacturing a mixed crystal crop, consisting essentially of potassium pentaborate octohydrate and sodium bicarbonate, which comprises adding potassium chloride, sodium tetraborate, and water to a liquor containing mainly sodium chloride and carbonating the resulting sludge, about 3.1 parts sodium tetraborate, 3.5 parts $H_2O$, and 0.8 part of carbon dioxide and 8 to 20 parts of liquor being added for each part of KCl added, precipitating the mixed crystal crop during the carbonation operation while producing a liquor high in sodium chloride and low in values of potassium and borate, separating the liquor from the mixed crystal crop, and recycling liquor to the first operation.

5. A process of manufacturing a mixed crystal crop, consisting essentially of potassium pentaborate octohydrate and sodium bicarbonate, which comprises adding potassium chloride, sodium tetraborate, and water to a liquor containing mainly sodium chloride and carbonating the resulting sludge, the potassium chloride, sodium tetraborate, water, and carbon dioxide employed being in ratios suitable for producing potassium pentaborate octohydrate and sodium bicarbonate, precipitating said mixed crystal crop during the carbonation operation while forming the residual solution, which consists principally of sodium chloride and contains minor quantities only of potassium and borate compounds, separating the mixed crystal crop from said liquor, and using part of said liquor in said first operation.

6. A process of manufacturing a mixed crystal crop, consisting essentially of potassium pentaborate octohydrate and sodium bicarbonate, which comprises adding to a solution consisting mainly of sodium chloride, the ingredients potassium chloride, borax, and water in proportions to form potassium pentaborate octohydrate and sodium bicarbonate on carbonation, carbonating the resulting sludge to form and precipitate said mixed crystal crop while forming a solution containing mainly sodium chloride and minor quantities only of potassium and borate value, separating the mixed crystal crop from said solution, and thereafter subjecting the separated solution to a secondary crystallization operation to form a second crystal crop which analyses mainly sodium tetraborate and potassium pentaborate, thereby further reducing the potassium and borate values of the liquor.

FRANK HENDERSON MAY.